United States Patent [19]

Cho et al.

[11] Patent Number: 5,547,492
[45] Date of Patent: Aug. 20, 1996

[54] METHOD FOR ADSORBING AND SEPARATING ARGON AND HYDROGEN GASES IN HIGH CONCENTRATION FROM WASTE AMMONIA PURGE GAS, AND APPARATUS THEREFOR

[75] Inventors: Soon-Haeng Cho; Kuck-Tack Chue; Jong-Nam Kim; Kwon-Il Kim; Youn-Jong You, all of Daejeon-Si; Seng-Go Lee, Ulsan-Si, all of Rep. of Korea

[73] Assignee: Korea Institute of Energy Research, Daejon-si, Rep. of Korea

[21] Appl. No.: 258,181

[22] Filed: Jun. 10, 1994

[30] Foreign Application Priority Data

Apr. 12, 1994 [KR] Rep. of Korea ......................... 94-7563

[51] Int. Cl.⁶ .............................................. B01D 53/053
[52] U.S. Cl. ............................... 95/100; 95/101; 95/105; 95/122; 95/128; 95/130; 95/143
[58] Field of Search ......................... 95/96–98, 100–105, 95/117, 119, 122, 127, 128, 130, 143, 148; 96/121, 131–133

[56] References Cited

U.S. PATENT DOCUMENTS

| | | | |
|---|---|---|---|
| 3,564,816 | 2/1971 | Batta | 95/100 |
| 3,636,679 | 1/1972 | Batta | 95/100 |
| 3,738,087 | 6/1973 | McCombs | 95/98 |
| 3,996,028 | 12/1976 | Golovko et al. | 95/103 |
| 4,171,207 | 10/1979 | Sircar | 95/101 |
| 4,432,774 | 2/1984 | Jüntgen et al. | 95/96 |
| 4,477,265 | 10/1984 | Kumar et al. | 95/96 X |
| 4,529,412 | 7/1985 | Hayashi et al. | 95/96 |
| 4,661,125 | 4/1987 | Haruna et al. | 95/102 |
| 4,689,062 | 8/1987 | MacLean et al. | 62/18 |
| 4,732,577 | 3/1988 | Koizumi et al. | 95/101 |
| 4,752,311 | 6/1988 | MacLean et al. | 62/18 |
| 4,775,394 | 10/1988 | Yamano et al. | 95/101 |
| 4,816,039 | 3/1989 | Krishnamurthy et al. | 95/97 |
| 4,834,956 | 5/1989 | Agrawal et al. | 95/102 X |
| 4,861,361 | 8/1989 | Jain et al. | 95/96 X |
| 4,913,709 | 4/1990 | Kumar | 95/100 |
| 4,914,218 | 4/1990 | Kumar et al. | 95/100 |
| 5,100,447 | 3/1992 | Krishnamurthy et al. | 95/97 X |
| 5,106,399 | 4/1992 | Fisher | 95/117 X |
| 5,125,934 | 6/1992 | Krishnamurthy et al. | 95/101 |
| 5,137,549 | 8/1992 | Stanford et al. | 95/98 |

FOREIGN PATENT DOCUMENTS

| | | | |
|---|---|---|---|
| 58-167410 | 10/1983 | Japan | 95/102 |
| 60-239310 | 11/1985 | Japan | 95/96 |
| 60-261525 | 12/1985 | Japan | 95/96 |
| 62-132712 | 6/1987 | Japan | 95/103 |
| 63-189774 | 8/1988 | Japan | 95/96 |
| 63-239105 | 10/1988 | Japan | 95/96 |
| 1-257113 | 10/1989 | Japan | 95/96 |
| 2-272288 | 11/1990 | Japan | 95/96 |
| 2-275707 | 11/1990 | Japan | 95/117 |
| 2177079 | 1/1987 | United Kingdom | 95/117 |

*Primary Examiner*—Robert Spitzer
*Attorney, Agent, or Firm*—Armstrong, Westerman, Hattori, McLeland & Naughton

[57] ABSTRACT

A method for recovering argon and hydrogen simultaneously from a feed mixture comprising argon, hydrogen, methane, nitrogen, ammonia, and moisture by passing a two stage adsorption separation (PSA). The feed gas including 4–6% hydrogen is sent to the first stage PSA to obtain a product hydrogen during the first period of adsorption step, and to obtain an intermediate product of argon and hydrogen mixture during the next period of adsorption step. The adsorbed gases are evacuated and sent to fuel gas. The intermediate product argon and hydrogen mixture is sent to the second stage adsorption bed. The effluent of adsorption step is recovered as another product hydrogen. After the adsorption step, the second stage adsorber is undergone concurrent blowdown, pressure equalization, argon recovery, argon purge, desorption production of argon, pressure equalization, pressurization with product hydrogen. Through such cyclic operation of two-stage PSA, high purity argon and hydrogen are recovered simultaneously.

3 Claims, 5 Drawing Sheets

PRE-TREATMENT PROCESS

| STEP | TIME | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 53 | 54 |
|---|---|---|---|---|---|---|---|---|---|---|---|---|---|---|---|---|---|---|---|---|---|---|---|---|---|---|---|---|---|---|---|
| 1 | 4 | 1 | | | | | | | | | | | | | | | | | | | | | | | | | | | | | 54 |
| 2 | 4 | 1 | | | | 5 | | | | | | | | | | | | | | | | | | | | | | | | | |
| 3 | 4 | 1 | | 3 | | 5 | | | | | | | | | | | | | | | | | | | | | | | | | |
| 4 | 50 | 1 | | 3 | | 5 | | | | | | | | | | | | | | | | | | | | | | | | | |
| 5 | 15 | 1 | | 3 | | 5 | | | | | | | | | | | | | 18 | | | | | | | | | | | | |
| 6 | 15 | 1 | | 3 | | 5 | | | | | | | | | | 15 | | | 18 | | | | | | | | | 27 | | 53 | |
| 7 | 40 | 1 | | 3 | | | | | | | | | | | | 15 | | | 18 | | | | 22 | | | | | 27 | | | |
| 8 | 4 | | 2 | 3 | | | | 7 | | | | | | | | | | | 18 | | | | 22 | | | | 26 | 27 | | | |
| 9 | 4 | | 2 | 3 | | | 6 | 7 | | 9 | | | | | | | | | | | | | 22 | | 24 | | 26 | 27 | | | |
| 10 | 4 | | 2 | 3 | | | 6 | 7 | | 9 | | | | | 14 | | | | | | 20 | | 22 | | 24 | | 26 | 27 | | | |
| 11 | 50 | | 2 | 3 | | | 6 | 7 | | | | 11 | | | 14 | | | | | | 20 | | | | 24 | | 26 | | | | |
| 12 | 15 | | 2 | 3 | | | 6 | 7 | | | | 11 | | | | | | | 18 | | 20 | | 22 | | 24 | | | | | | |
| 13 | 15 | | 2 | 3 | | | 6 | | | | | | | | | | | | | | 20 | | 22 | | 24 | | | | | | |
| 14 | 40 | | 2 | 3 | | | | | | | | | | | | | | | | | 20 | | 22 | | 24 | | | | | | |
| 15 | 4 | | | | 4 | | | | 8 | | | | | | | | 16 | 17 | | | | 21 | | | | | | | | | |
| 16 | 4 | | | | 4 | | | | 8 | | 10 | | | 13 | | | 16 | 17 | | 19 | | 21 | | | | | | | | | |
| 17 | 4 | | | | 4 | | | | 8 | | 10 | | | 13 | | | | 17 | | 19 | | 21 | | | | | | | 28 | | |
| 18 | 50 | | | | 4 | | | | 8 | | | | 12 | | | | | 17 | | 19 | | 21 | | | | | | | 28 | | |
| 19 | 15 | | | | 4 | | | | 8 | | | | 12 | | | | | 17 | 18 | 19 | | 21 | | | | | | | 28 | | |
| 20 | 15 | | | | 4 | | | | | | | | | | | | | | 18 | 19 | | | | | | | | | 28 | | |
| 21 | 40 | | | | 4 | | | | | | | | | | | | | | | 19 | | | | 23 | | 25 | | | | 53 | |
| 22 | 4 | | | | | | | | | | | | | | | | | | | | | | | 23 | | 25 | | | | | |
| 23 | 4 | | | | | | | | | | | | | | | | | | | | | | | 23 | | 25 | | | | | |
| 24 | 4 | | | | | | | | | | | | | | | | | | | | | | | 23 | | 25 | | | | | |
| 25 | 50 | | | | | | | | | | | | | | | | | | | | | | | 23 | | | | | | | |
| 26 | 15 | | | | | | | | | | | | | | | | | | | | | | | | | | | | | | |
| 27 | 15 | | | | | | | | | | | | | | | | | | | | | | | | | | | | | 53 | |
| 28 | 40 | | | | | | | | | | | | | | | | | | | | | | | | | | | | | | 54 |

FIG. 3

MAIN PROCESS

| STEP | TIME | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 55 | 56 |
|---|---|---|---|---|---|---|---|---|---|---|---|---|---|---|---|---|---|---|---|---|---|---|---|---|---|---|---|
| 1 | 4 | | | | | | | | | | | | | | | | | | | | | | | | 52 | 55 | 56 |
| 2 | 4 | | | | | | | | | | | | 40 | | | | | | | | | | | | | | 56 |
| 3 | 4 | | | | | | | | | | | | | 41 | | | | | | | | | | | | | |
| 4 | 50 | | | | | 33 | | | | | | | | 41 | | | | | | | | | 50 | | | | |
| 5 | 15 | | | | | 33 | | | | | | | 40 | | | | | | | 47 | | | 50 | | | | |
| 6 | 15 | 29 | | | | 33 | | | | | | | 40 | | | | | | | 47 | | | 50 | | | 55 | |
| 7 | 40 | 29 | | | | 33 | | | | | | | | | | | | | | | | | 50 | | | 55 | |
| 8 | 4 | | | | | | | | | 37 | | | | | 42 | | | | | | | | 50 | | | | 56 |
| 9 | 4 | | | | | | 34 | | | | | | | | 42 | | | | | | | | 50 | | | | |
| 10 | 4 | | | | | | 34 | | | 37 | | | | | | | | | | | | | | | | | |
| 11 | 50 | | | | | | 34 | | | 37 | | | | 41 | | | | | | | | | 50 | | | | |
| 12 | 15 | | | | | | 34 | | | | 38 | | | 41 | | | | | | | | | 50 | | | | |
| 13 | 15 | | 30 | | | | | 35 | | | 38 | | | | | | | | | | | | | 51 | | | |
| 14 | 40 | | 30 | | | | | 35 | | | 38 | | | | | | | | | | | | | 51 | | | |
| 15 | 4 | | | | | | | 35 | | | | 39 | | | | | | | | | | | | 51 | | | |
| 16 | 4 | | | 31 | | | | 35 | | | | 39 | | | 42 | | | | | | | | | 51 | | | |
| 17 | 4 | | | 31 | | | | | 36 | | | | | | 42 | 43 | | | | | | | | 51 | | | |
| 18 | 50 | | | | | | | | 36 | | | | | | | 43 | 44 | | | | | | | 51 | | | |
| 19 | 15 | | | | | | | | 36 | | | 39 | | | | | 44 | 45 | | | | | | 51 | | | |
| 20 | 15 | | | | | | | | 36 | | | 39 | | | | | | 45 | 46 | | | | | | 52 | 55 | |
| 21 | 40 | | | | | | | | | | | | | | | | | | 46 | | | | | | 52 | 55 | |
| 22 | 4 | | | | | | | | | | | | | | | | | | | | | 49 | | | 52 | | 56 |
| 23 | 4 | | | | | | | | | | | | | | | | | | | | 48 | 49 | | | 52 | | |
| 24 | 4 | | | | | | | | | | | | | | | | | | | | 48 | 49 | | | 52 | | |
| 25 | 50 | | | | | | | | | | | 39 | | | 42 | 43 | 44 | | | | | 49 | | | | | |
| 26 | 15 | | | | | | | | 36 | | | 39 | | | 42 | 43 | 44 | | | | | 49 | | | | | |
| 27 | 15 | | | | 32 | | | | 36 | | | | | | | | | | | | | 49 | | | | 55 | |
| 28 | 40 | | | | 32 | | | | 36 | | | | | | | | | | | | | 49 | | | | 55 | |

FIG. 4

METHOD FOR ADSORBING AND SEPARATING ARGON AND HYDROGEN GASES IN HIGH CONCENTRATION FROM WASTE AMMONIA PURGE GAS, AND APPARATUS THEREFOR

FIELD OF THE INVENTION

The present invention relates to an apparatus and a method, adsorbing nitrogen, methane, ammonia and moisture to remove them, and then obtaining high purity argon and hydrogen simultaneously thereby realizing a two-stage adsorbing-separating method.

BACKGROUND OF THE INVENTION

Generally, argon gas is contained in the atmosphere by 0.93%, and therefore, argon gas is obtained as a byproduct in the factory in which nitrogen and oxygen gases are liquified and separated. There is no process for obtaining only argon gas. However, as argon gas is required in greater amounts than nitrogen and oxygen gases, another argon manufacturing source is required. In the ammonia purge gas, argon is contained by 4–6%, and hydrogen is contained by about 60%. Usually, therefore, the ammonia purge gas is burned as a fuel, and the argon gas is released into the atmosphere.

The conventional argon recovery method is carried out in the following manner. The ammonia purge gas is passed through a drier to remove the moisture, and is liquified to recover hydrogen. Then nitrogen is removed, and then, methane or argon is separated. Thus argon is recovered through multiple stage, cryogenic distillation, and therefore, the facility cost and the liquefying energy are required too much, with the result that the method is not widely used.

In BOC of the United States (U.S. Pat. No. 4,689,062, and 4,752,311, and European Patent 0239234), hydrogen is recovered by applying a cryogenic method or membrane separating method. Then the hydrogen depleted gas mixture in which argon is contained by 12% is subjected to a concentration process by applying a PSA (pressure swing adsorption) method until argon is concentrated to 21% (hydrogen: 26.4%, argon: 21.4%, and nitrogen: 52.2%). The resultant mixture gas is sent to a cold box to liquify it, and then, the argon is recovered by using a distillation column which consists of more than 40 trays.

SUMMARY OF THE INVENTION

The present invention is intended to overcome the above described inconveniences of the conventional techniques.

Therefore it is the object of the present invention to provide a method and an apparatus for adsorbing and recovering argon and hydrogen in a high concentration from a waste ammonia purge gas, in which an ammonia purge gas containing 4–6% of argon after absorption-removing ammonia, is passed through a first stage adsorber so as to recover a large amount of hydrogen as a product during the first period of adsorption step, to obtain an intermediate product of argon and hydrogen mixture (argon is enriched up to 10–16%) during the second period of the adsorption step, and to remove methane, nitrogen, ammonia, and moisture by regeneration. The argon enriched intermediate product is passed through a second stage adsorber so as to obtain another high purity hydrogen during the adsorption step, and to obtain a high purity argon during the evacuation production step.

BRIEF DESCRIPTION OF THE DRAWINGS

The above object and other advantages of the present invention will become more apparent by describing in detail the preferred embodiment of the present invention with reference to the attached drawings in which:

FIG. 1 illustrates the variations of the concentrations of the gases which come out from a pre-treatment adsorption (the first stage PSA)

FIG. 3 illustrates the operating steps for the pre-treatment stage and the closing/opening of the valves;

FIG. 4 illustrates the operating steps for the main adsorption stage and the closing/opening of the valves.

DESCRIPTION OF THE PREFERRED EMBODIMENT

The method for separating and recovering hydrogen and argon simultaneously from ammonia purge gas according to the present invention will be described.

Figure 5:
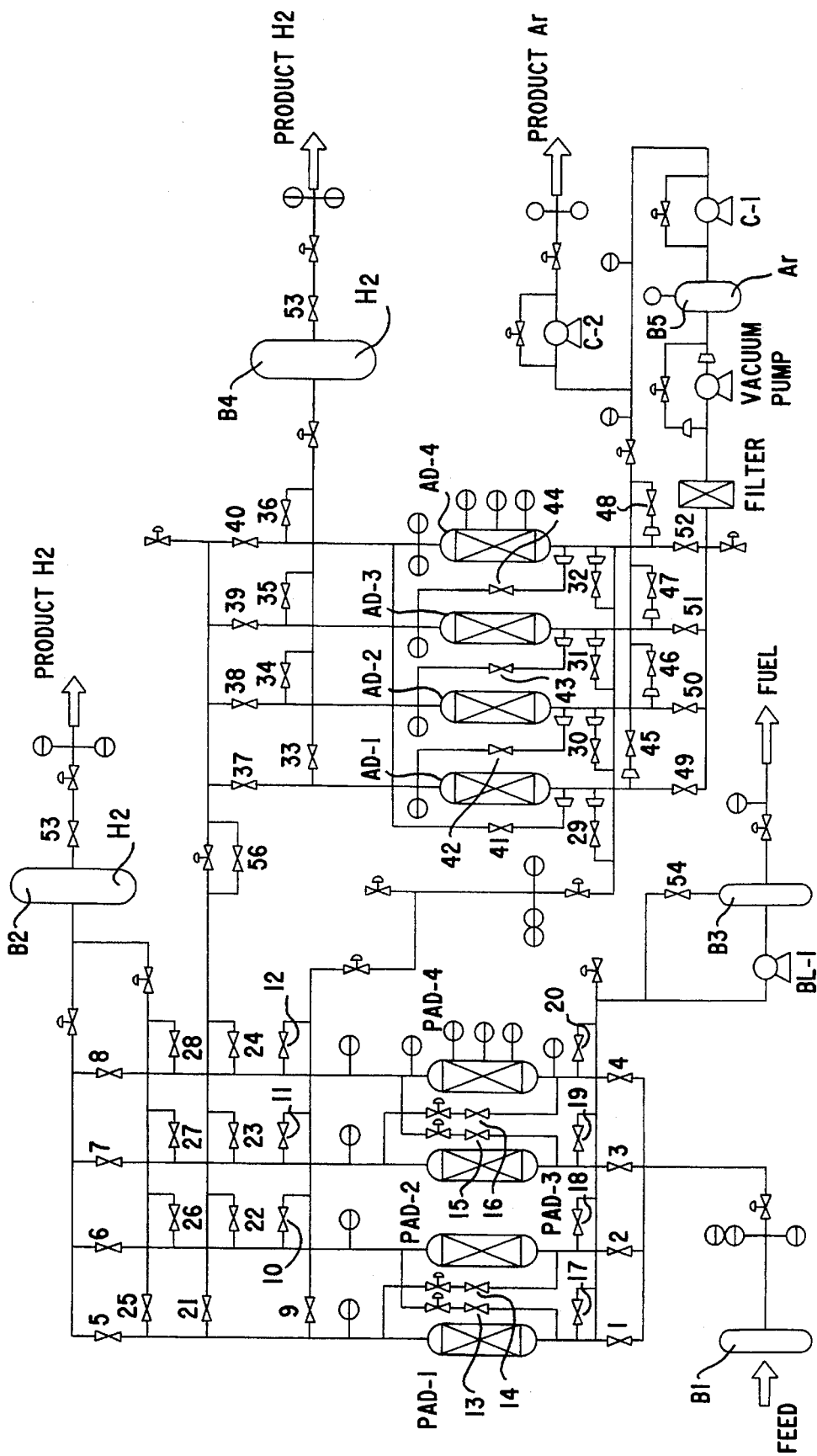
FIG. 5 illustrates the process flow sheet for recovering argon and hydrogen from ammonia purge gas.

As shown in FIG. 5, the apparatus includes: four pre-treatment adsorbers (first stage) PAD-1, PAD-2, PAD-3, and PAD-4; and four main adsorption stage adsorbers (second stage) AD-1, AD-2, AD-3 and AD-4. Adjusting valves (labelled as elements 1–56) for adjusting the flow of the gases at the respective operating steps are provided in the number of 56. There are further provided: a roots blower BL-1 for transferring the desorbed discharge gas of the pre-treatment adsorption beds to fuel gas; a vacuum pump for desorption-recovering the product argon from the main adsorption beds; and two argon compressors C-1 and C-2 for compressing the product.

The operation of the pre-treatment beds which are the first stage, undergoes the following steps. Among the gases which are sent through a valve 1 to the adsorption bed PAD-1, the elements having a strong adsorption property are adsorbed on the adsorbent, and the hydrogen which is relatively weakly adsorbed is transferred through a valve 5 to a hydrogen product storage B2. Under this condition, some of the gases for which the flow rate has been regulated are transferred through a valve 27 into the upper portion of the adsorption bed PAD-3 which has been regenerated. At the same time, gas is discharged through a valve 15 from the other adsorption bed PAD-4 which has completed the adsorption step. This discharged gas enters into the adsorption bed PAD-3, so that the adsorption bed PAD-3 should be pressurized from the upper and lower directions. Under this condition, the gas which is discharged from the main adsorption stage (second stage) is transferred through a valve 22 to the adsorption bed PAD-2 to purge and desorb the gases which have been adsorbed on the adsorbent. This gas mixture passes through a valve 18 and a roots blower BL-1 to be discharged so that it should be sent to fuel gas.

When the pressures of the adsorption beds PAD-4 and PAD-3 are made equal with each other, the valve 15 is closed, while the adsorption bed PAD-3 is continuously pressurized with the hydrogen which is supplied from the upper portion. When the pressurization of the adsorption bed PAD-3 is completed, the concentrated hydrogen is discharged through a valve 53. This hydrogen can be recycled to an ammonia synthesis reactor, or a reformer to be utilized as a chemical feed stock.

When the argon gas is discharged through the upper portion of the adsorption bed PAD-1, the valves 5 and 53 are closed, and a valve 9 is opened, so that the mixture of argon and hydrogen gases should be transferred to the main adsorption stage where argon and hydrogen are separated into two streams of product.

Just before the nitrogen makes a break-through from the top end of the adsorption bed PAD-1, the valves 1 and 9 are closed, thereby completing the adsorption step of the first stage. Under this condition, a large amounts of argon and hydrogen remain in the upper portion of the adsorption bed PAD-1. Therefore, in order to pressurize the adsorption bed PAD-2 by recovering the said elements the gases of the adsorption bed PAD-1 enter through a valve 14 into the lower part of the adsorption bed PAD-2. At the same time, the adsorption bed PAD-2 is pressurized with product hydrogen through the valve 26. When the bed PAD-2 is continuously pressurized with the product hydrogen through the valve 26. When the pressures of the adsorption bed PAD-1 and the adsorption bed PAD-2 reach similar levels to form an equalization pressure, the adsorption bed PAD-2 is continuously pressurized with the product hydrogen. At the same time, the adsorption bed PAD-3 undergoes an adsorption step, and the adsorption bed PAD-4 is subjected to purge and desorption, while the adsorption bed PAD-1 is temporarily put to rest. Then the adsorption bed PAD-1 is subjected to a pressure reduction upon the opening of valves 17 and 54, so that the gases within the adsorption bed should be discharged to be sent to the fuel gas. After the pressure of the adsorption bed is lowered to a certain level, the valve 54 is closed, and even the lowered pressure is further lowered by the roots blower BL-1. Thus the nitrogen, methane, ammonia and moisture which have been adsorbed onto the adsorption bed PAD-1 are desorbed so as to be sent to the fuel gas.

After the pressure reduction and regeneration are carried out for about one minute, the discharge gas from the main adsorption stage enters through a valve 21 into the upper portion of the adsorption bed PAD-1 to pass through the layers of the adsorbent. Thus the layers of the adsorbent are cleaned, thereby washing off the remaining elements which have a strong adsorptive property.

After the completion of the purge step, the mixture of the argon and hydrogen gases which has been remaining on the upper part of the adsorption bed PAD-2 is transferred through a valve 13 into the adsorption bed PAD-1. At the same time, the hydrogen of the hydrogen storage B-2 is transferred through a valve 25 into the upper part of the adsorption bed PAD-1, thereby making a pressurization. When the pressures of the adsorption bed PAD-1 and the adsorption bed PAB-2 are made equal with each other, the valve 13 is closed, and the hydrogen pressurization is continued, so that the adsorption bed PAD-1 should be subjected to a pressurization up to the level of the adsorption pressure, before being ready for the next adsorption step.

Such operations are alternately done in the four adsorption beds, and the cycles are continuously carried out to realize a continuous operation. In the first stage, the mixture of hydrogen and argon which is obtained as an intermediate product shows a low concentration of argon at first, but the argon concentration increases toward the end of the adsorption step. Thus, the argon partial pressure is highest at the end of the adsorption step at the main adsorption bed (the second stage).

The main adsorption stage which is the second stage adsorption is also continuously operated in engagement with the adsorption beds of the first stage. The adsorption bed AD-1 which has completed a vacuum desorption is put to a rest temporarily, while the adsorption bed AD-2 begins desorption upon opening a valve 50. Meanwhile, the adsorption bed AD-4 which has completed the adsorption step is subjected to a pressure reduction upwardly upon opening valves 40 and 56. Under this condition, the discharged gas is used for purging the pretreatment adsorption beds. When the pressure of the adsorption bed AD-4 reaches a certain level, the valves 40 and 56 are closed, while a valve 41 is opened. The gas which is discharged from the top end of the adsorption bed AD-4 enters into the lower part of the adsorption bed AD-1, so that the adsorption bed AD-1 should be subjected to a pressurization, and that the adsorption bed AD-4 should be subjected to a pressure reduction down to the purge pressure. When the pressures of the adsorption bed AD-1 and the adsorption bed AD-4 become equal with each other, the valve 41 closed, and a valve 33 is opened. Thus hydrogen from a hydrogen storage B-4 is transferred into the adsorption bed AD-1 to subject it to a pressurization up to about the adsorption pressure level.

When the pressurization is completed, the feed gas which consists of argon and hydrogen enters through a valve 29 into the adsorption bed AD-1 to be adsorbed by it, while the hydrogen which has passed through the adsorption bed AD-1 is transferred through the valve 33 into the hydrogen storage B-4. Under this condition, a certain amount of hydrogen can be discharged as a final product, or can be recycled as a synthesizing gas.

When the adsorption step is completed, the valves 29 and 33 are closed, and the valves 37 and 56 are opened, so that the gas remaining in the adsorption bed AD-1 should be discharged in a pressure-reduced state so as to be used as a cleaning gas for the pre-treatment adsorption stage. When the pressure of the adsorption bed AD-1 drops to a predetermined level, the valves 37 and 56 are closed, and a valve 42 is opened, so that the adsorption bed AD-1 and the adsorption tower AD-2 should have an equal pressure. Under this condition, a gas containing a large amount of argon is discharged from the top end of the adsorption bed AD-1, and this gas enters into the bottom end of the adsorption bed AD-2, thereby making it possible to recover more argon.

When the pressure equalization step is completed, the adsorption bed AD-1 reaches the purge pressure. Then a valve 48 is opened, and the valves 41 and 37 are also opened, so that a part of the product argon should enter into the bottom of the adsorption bed AD-4 to purge the hydrogen remaining in the adsorption bed AD-4. The purged hydrogen is pushed upward. Here, the discharged gas contains a large amount of argon. Therefore, the gas enters into the bottom portion of the adsorption bed AD-1 so as to absorb the argon and to reduce the argon loss during the purge step. The gas discharged upward is used as the purge gas again for the pre-treatment stage.

When the adsorption bed AD-4 has been cleaned, and when the purge discharge gas has been recovered from the adsorption bed AD-1, the operation enters into the purge step for the adsorption bed AD-1. A part of the discharged gas of the argon compressor C-1 enters through a valve 45 into the bottom of the adsorption bed AD-1 to purge the residue hydrogen in the voids of the adsorption bed AD-1 through substitution. Under this condition, the upwardly discharged gas contains a large amount of argon, and therefore, the gas is sent through the valve 42 to the adsorption bed AB-2 to make it possible to recover argon. Meanwhile, the gas which has passed through the adsorption bed AD-2 flows through a valve 38 so as to be used as the cleaning gas for the pre-treatment stage.

When the adsorption tower AD-1 is sufficiently cleaned with the product argon, the purge is terminated. Then the valve 49 is opened, and a vacuum pump is used to subject the adsorber to be evacuated and to be desorbed, thereby obtaining the high purity product. The product argon gas which is discharged from the vacuum pump is compressed to 0.8–1.6 kg/cm G by means of the argon compressor C-1. A part of the compressed gas is used for the purge, while the rest is further compressed to the required level of pressure by means of the argon compressor C-2. This compressed argon gas is shipped as the product, or is sent to a liquefying section.

In this manner, one cycle of the adsorption bed AD-1 is carried out, and the four adsorption beds are alternately operated, so that the overall operation should be continuous. Through this operation, high purity hydrogen and high purity argon are obtained as products simultaneously.

Figure 1A:
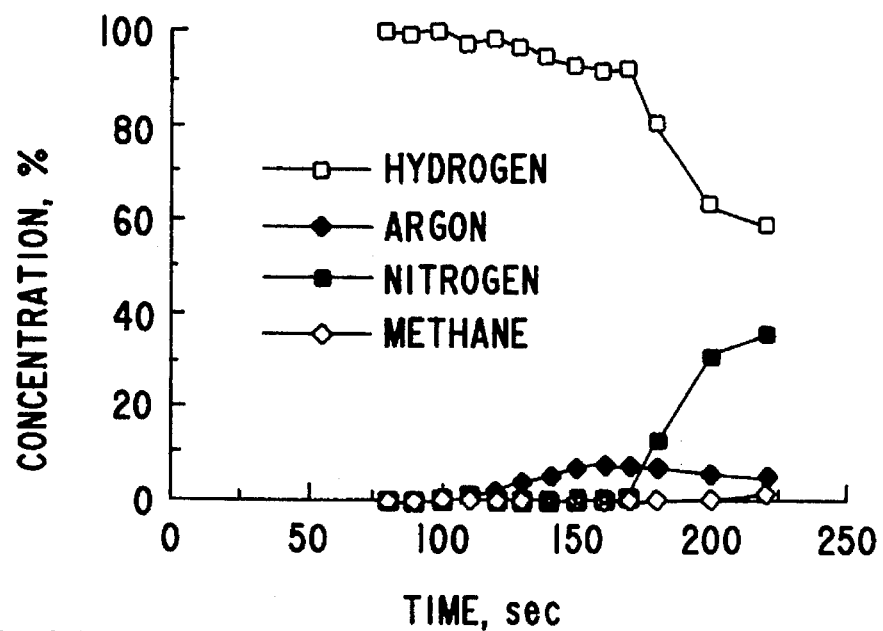
FIG. 1(a) is the variation of composition in the effluent gas from the first stage adsorber.
Figure 1B:
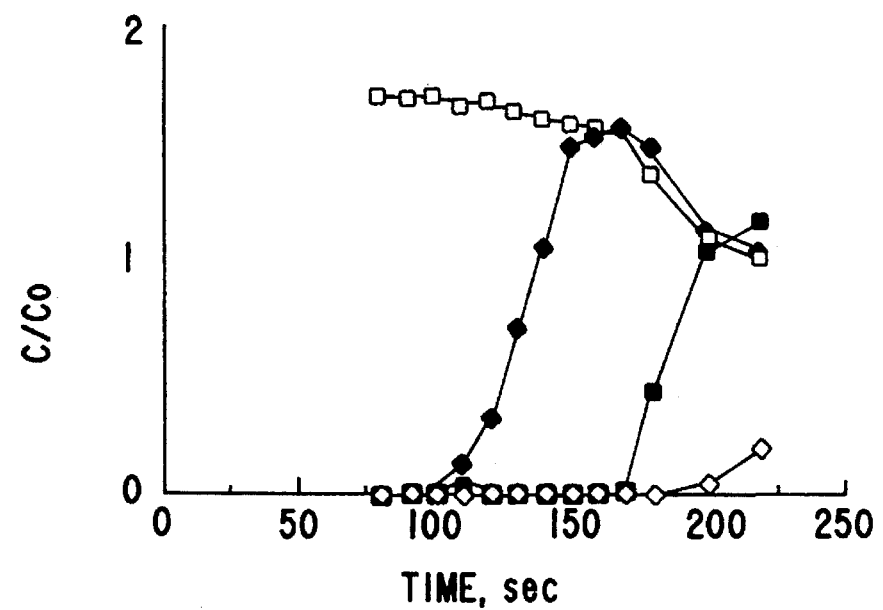
FIG. 1(b) is the relative concentration variation thereof. Hydrogen comes out during the first 100 seconds, and hydrogen and argon mixture comes out from 100 seconds to 170 seconds before the other gases breakthrough.

FIGS. 1(a) and 1(b) illustrate the contents and the concentration of the gas discharged from the pretreatment beds after inputting of the ammonia purge gas. As shown in these drawings, during the initial period of 80 seconds, only hydrogen was discharged. From then, argon began to be discharged, and the concentration of the argon became higher than the concentration of argon in the raw feed gas. Then, in 170 seconds, nitrogen began to be discharged, and then, methane came out. Thus, only the gas portion of the intermediate period from 100 seconds to 170 seconds can be captured as an intermediate product, in which argon is enriched with a little or no nitrogen and methane.

Figure 2:
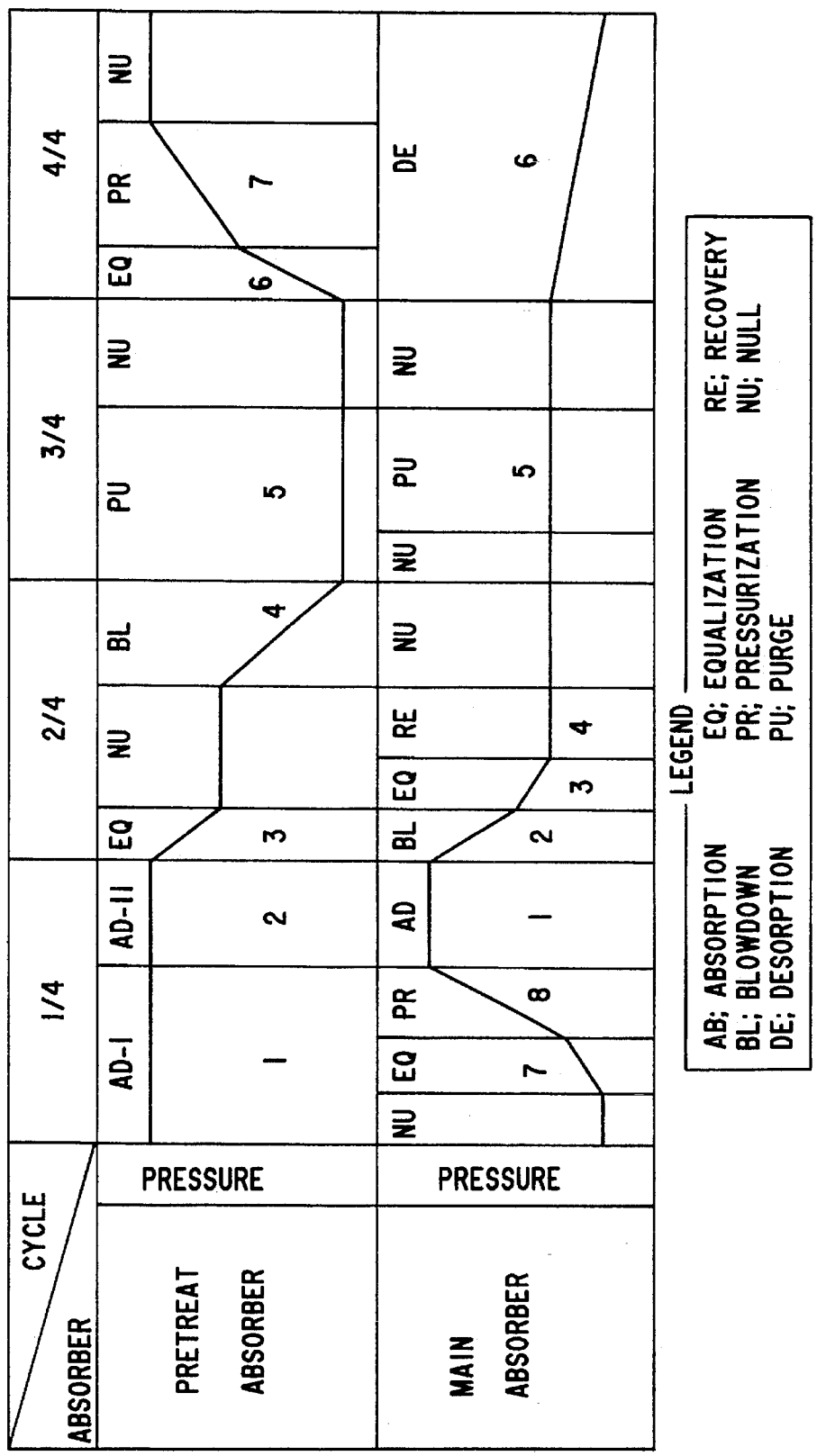
FIG. 2 illustrates the operating steps and the variation of the pressure in the respective adsorption beds within a single process cycle.

FIG. 2 illustrates the order of the operating steps for the above described pretreatment adsorption stage and the main adsorption stage, and also illustrates the patterns of the variations of the pressures accompanying there to.

FIG. 3 illustrates the closing/opening of the valves at different time points in the pre-treatment adsorption beds which belong to the first stage adsorption.

FIG. 4 illustrates the closing/opening of the valves at different time points in the main adsorption beds which belong to the second stage adsorption.

The closing and opening time points for the valves should be adjusted properly in accordance with the operating temperature, and the composition and supply pressure of the ammonia purge gas.

What is claimed is:

1. A method for adsorption and recovery of argon and hydrogen simultaneously with a high concentration from ammonia purge gas, comprising:

removing ammonia, moisture, methane and nitrogen from an ammonia purge gas by passing the ammonia purge gas through a first adsorption stage of a four bed pressure swing adsorption, thereby recovering a large amount of hydrogen as a product during a first period of adsorption step and obtaining an intermediate product consisting of an argon-hydrogen mixture containing about 10–16% argon by volume during a second period of adsorption; and passing the intermediate argon-hydrogen mixture through a second stage of adsorption of a four bed pressure swing adsorption, thereby obtaining simultaneously argon and hydrogen as high purity products.

2. The method as claimed in claim 1, wherein in the operation of the first adsorption stage with four beds a pressure swing adsorption separation is applied such that initially discharged hydrogen is recovered from one of the beds as a product, a gas mixture of hydrogen and argon discharged during the second period of adsorption step is collected as another product, and nitrogen, methane, ammonia and moisture remaining in the bed are subjected to pressure reduction for adsorption and removal, thereby regenerating the bed.

3. The method as claimed in claim 1, wherein, in the operation of the second adsorption stage with four beds, an adsorption process is applied in such a manner that:

a feed gas of a mixture of two gases like the intermediate argon-hydrogen mixture is sent to one of the beds so as to adsorb argon and to obtain a product of hydrogen gas flowing out of the top of the bed at an adsorption pressure;

the content of the hydrogen gas in the bed is reduced by applying a concurrent blow down process, and the pressure of the bed is reduced at the same time;

an equalization step is applied to reduce again the pressure of the bed down to a pressure level which is nearly same as the partial pressure of argon in the feed gas, in order to clean the argon by purging with a high purity argon at said pressure level during following purge step, and to pressurize simultaneously another bed of the second stage which has completed a desorption step;

a recovery step is applied to the bed to recover argon gas in the effluent from the purge step of the other bed of the second stage;

a purge step is applied to purge out remaining hydrogen gas from the bed by supplying a high purity argon product into the bed;

after the purge step, the bed containing the high purity argon gas is subjected to a desorption step to obtain argon gas as another product from the bottom of the bed;

the bed which has completed the desorption step is pressurized by pressure equalization with the other bed which has completed the concurrent blow down step, thereafter, the bed is pressurized more by supplying a high purity hydrogen product to the top of the bed to be ready for the next cycle;

whereby hydrogen gas and argon gas are separated into two high purity products in only single adsorption separation stage.

* * * * *